(12) United States Patent
Wilhelmsson et al.

(10) Patent No.: US 8,706,108 B2
(45) Date of Patent: Apr. 22, 2014

(54) FREQUENCY SCANNING TECHNIQUE FOR A CELL SEARCH PROCEDURE

(75) Inventors: Leif Wilhelmsson, Dalby (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 9 days.

(21) Appl. No.: 13/496,543

(22) PCT Filed: Oct. 16, 2009

(86) PCT No.: PCT/EP2009/007450
§ 371 (c)(1),
(2), (4) Date: Apr. 10, 2012

(87) PCT Pub. No.: WO2011/044920
PCT Pub. Date: Apr. 21, 2011

(65) Prior Publication Data
US 2012/0184269 A1 Jul. 19, 2012

(51) Int. Cl.
*H04W 4/00* (2009.01)
(52) U.S. Cl.
USPC ............ 455/434; 455/426.1; 455/435.2; 455/552.1
(58) Field of Classification Search
USPC .......... 455/432.1–444, 426.1, 422.1, 69, 526, 455/41.1–41.3; 370/329, 350, 208, 315, 370/331, 332, 338, 342, 335
See application file for complete search history.

(56) References Cited

U.S. PATENT DOCUMENTS

2004/0161020 A1 8/2004 Mathew et al.
2004/0192296 A1* 9/2004 Ohmori ...................... 455/432.1
2007/0213063 A1* 9/2007 Odenwalder ................. 455/436
2008/0176546 A1* 7/2008 Devico et al. ................. 455/418
2010/0062764 A1* 3/2010 Aiouaz et al. ................. 455/434

FOREIGN PATENT DOCUMENTS

EP           1161111 A1    12/2001
WO      2007022429 A2     2/2007

OTHER PUBLICATIONS

ETRI: "Cell Search Scheme for EUTRA" 3GPP DRAFT: R1-060426, 3rd Generation Partnership Project (3GPP), Mobile Competence Centre, 650, Route Des Lucioles; F-016921 Sophia-Antipolis Cedex; France. vol. RAN WG1, no Denver, USA 20060208, Feb. 8, 2006, XP050101367 [retrieved on Feb. 8, 2006] paragraph 5.
Ericsson: "On Cell Search Performance" 3GPP DRAFT; R4-021461, 3rd Generation Partnership Project (3GPP), Mobile Competence Centre; 650, Route Des Lucioles; F-06921 Sophia-Antipolis Cedex; France. vol. RAN WG4, no. Secaucus, New Jersey, USA, Nov. 8, 2002, XP050171312 [retrieved on Nov. 8, 2002] the whole document.

* cited by examiner

*Primary Examiner* — Lester Kincaid
*Assistant Examiner* — Daniel Lai
(74) *Attorney, Agent, or Firm* — Coats and Bennett PLLC

(57) ABSTRACT

A technique for scanning multiple carrier frequencies during a cell search procedure is described. The cell search procedure involves for an investigated frequency multiple serially arranged processing steps until it will be determined that a network connection can be established on the investigated frequency. A method embodiment of this technique comprises performing a first processing step for an investigated first frequency, and in parallel with performing a second or further processing step for the first frequency, performing the first processing step for an investigated second frequency.

19 Claims, 4 Drawing Sheets

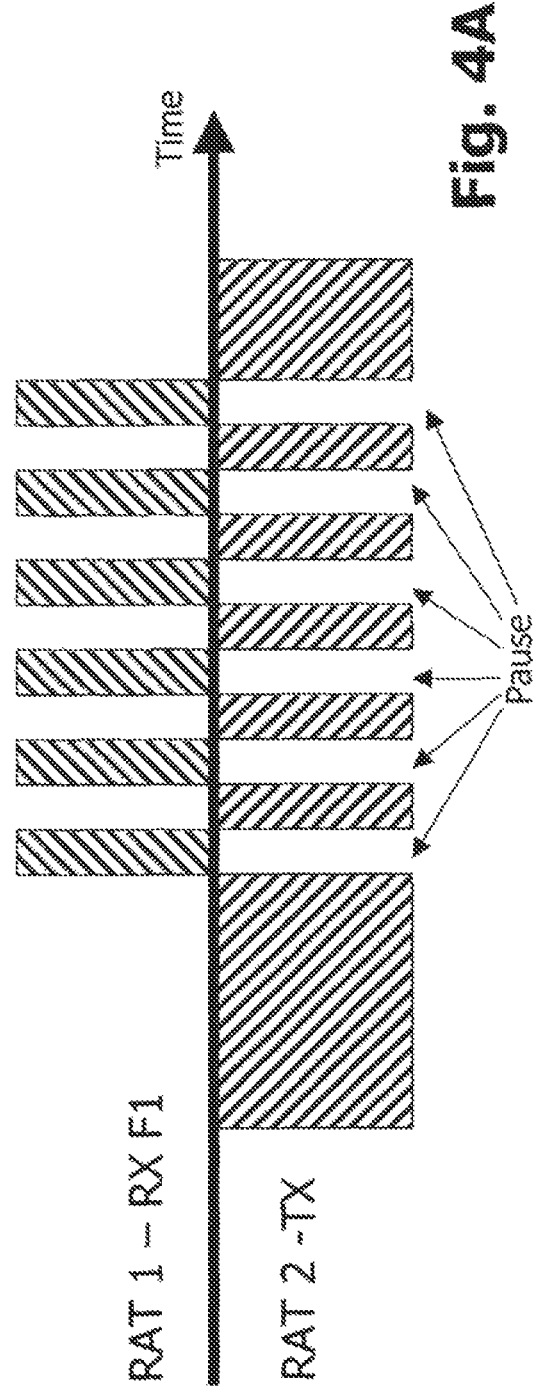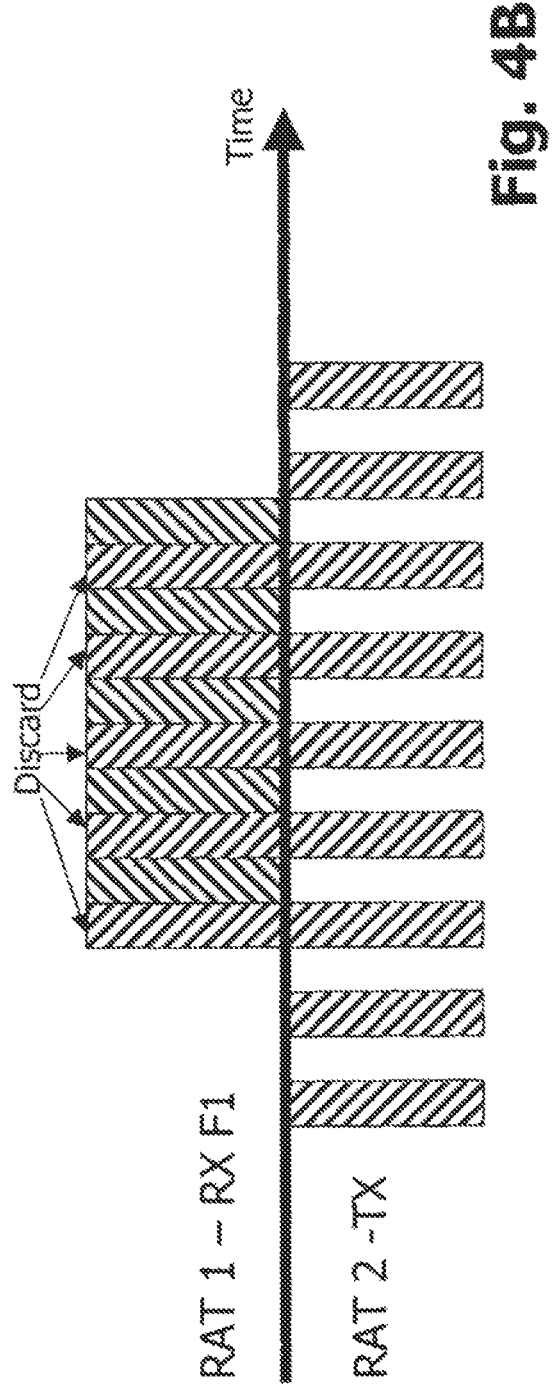

FREQUENCY SCANNING TECHNIQUE FOR A CELL SEARCH PROCEDURE

TECHNICAL FIELD

The present disclosure generally relates to cellular communication technologies. In particular, a technique for scanning multiple frequencies during a cell search procedure is disclosed.

BACKGROUND

When a cellular communication device is turned on (e.g., after a flight), the device has no or only little knowledge of what cellular networks might be available at the current site and on what frequencies. For this reason, the device initially performs a cell search procedure and scans frequencies where a cellular network might be found. During the frequency scan, multiple carrier frequencies in possibly multiple frequency bands are investigated as potential candidates for starting a network access procedure.

Due to the increased number of cellular telephones and other devices with cellular network access capabilities, the number of frequency bands for cellular communication is steadily increasing. Just recently, the bands for cellular services have been extended with Bands 40 (2300-2400 MHz, intended for TDD), Band 38 (2570-2620 MHz, intended for TDD), and Band 7 (2500-2570 and 2620-2690 MHz, intended for FDD). Consequently, more and more possible frequencies need to be scanned during the initial cell search procedure, and the cell search procedure generally takes more time.

Moreover, when Bands 7, 28 and 40 are scanned during a cell search procedure, the cellular communication device listens at frequencies that are close to the unlicensed ISM band (2400-2483.5 MHz). Should the device additionally support one or more further Radio Access Technologies (RATs) using this ISM band, the cell search procedure might be severely hampered. An example of an RAT operating in the ISM band is the BLUETOOTH communications standard. Another ISM band RAT that is gaining momentum in cellular communication devices is defined in the IEEE 802.11b/g standard.

SUMMARY

There is a general need to reduce the time required for performing a frequency scan during a cell search procedure. According to an optional aspect, there is a need to improve the flexibility of how the frequency scan can be performed by a first RAT system in order to function well in particular when disturbed by one or more other (e.g., co-located) RAT systems.

According to a first aspect, a method of scanning multiple carrier frequencies during a cell search procedure is provided, wherein the cell search procedure involves for an investigated frequency multiple serially arranged processing steps until it will be determined that a first network connection can be established on the investigated frequency. The method comprises performing a first processing step for an investigated first frequency, and in parallel with performing a second or further processing step for the first frequency, performing the first processing step for an investigated second frequency. Each processing step may comprise one or more processing operations.

It has been recognized that the time for a cell search procedure can be shortened by performing multiple processing steps of the procedure in a pipelined fashion with different processing steps being performed in parallel in relation to different carrier frequencies (e.g., still using only one receiver front-end). In addition, the cell search may take into consideration that access to the radio front-end can only be guaranteed for a fraction of the total time in order to support operations of other RAT systems that might be co-located in the same device. In this regard, the cell search procedure may be prioritized over operations of the other RAT systems without causing these operations to break down.

The method may comprise tuning from the first frequency to the second frequency, from the second frequency to a third frequency, and so on. Such a tuning approach is useful in configurations in which reception operations in context with the first processing step have to be carried out using a single receiver front-end.

The tuning step may be performed after (e.g., triggered by or responsive to) detection of one or more specific events. According to a first variant, the tuning step is performed after determining that sufficient first frequency samples have become available to perform the second processing step for the first frequency. According to a second variant, that can be combined with a first variant, the tuning step is performed after determining that the cell search procedure on the first frequency can be aborted. The cell search procedure on the first frequency may, for example, be aborted because it has been determined in the first, second or any further processing step that no network connection can be established on the first frequency.

The first processing step may include one or multiple operations. For example, the first processing step can include at least one of a tuning operation, a signal energy detection, an analog/digital signal conversion and a sample buffering. The second processing step may likewise comprise one or more operations including at least one an initial time estimation and an initial frequency estimation. The estimation operations in the second processing step may be performed for synchronization purposes.

The method may further comprise performing a third processing step for at least one of the investigated frequencies. The third processing step may include one or more operations such as at least one of a demodulation operation and a decoding operation.

In one implementation, the cell search procedure is performed on the basis of a first RAT, while a second connection via second RAT co-located with first RAT is active. The second connection may be a network connection (e.g., to another cellular network or to a Wireless Local Area Network). Alternatively, the second connection may be a direct link to another device (e.g., to a user device such as a hands-free set).

Knowledge of when the cell search procedure is performed based on the first RAT may be taken into account for transmitting via the second RAT. To this end, a communication link may be established between a first module supporting the first RAT on the one hand and a second module supporting the second RAT on the other hand. Via this communication link, information about an upcoming or ongoing cell search procedure may be communicated from the first module to the second module.

A transmission operation of the second RAT may be paused during at least a portion of the cell search procedure. Such a pausing of the transmission operation may be triggered via a signal or message communicated from the first module to the second module via the communication link described above. As an example, the transmission operation of the second RAT may be paused at least during a reception operation performed during the cell search procedure. Such a reception operation may, for example, be performed immediately after tuning to the first or any further frequency.

In one variation, the reception operation on a specific frequency is performed in multiple temporally spaced apart reception intervals. Between two temporally adjacent reception intervals, the transmission operation of the second RAT may be resumed.

A tuning operation may be performed once the reception operation on a specific frequency has been concluded. The reception operation can be concluded in response to various events. In one variant, it is determined after each reception interval if the next processing step for the specific frequency can already be performed. In response to a successful determination, the reception operation may then be concluded and the tuning operation may be started.

In one specific implementation, a transmission operation of the second RAT is performed in parallel with a portion of the cell search procedure, such as a reception operation, or the full cell search procedure. In such a case knowledge of when the second RAT is or has been transmitting may be taken into account when evaluating the result of one or more of the processing steps. To this end, the communication link discussed above may be utilized for communicating from the second module to the first module information about the transmission operation.

The knowledge of when the second RAT is or has been transmitting may be utilized for various purposes in the context of the cell search procedure. For example, samples, signal portions or measurements obtained by one or more of the processing steps during a transmission operation of the second RAT may be discarded. Alternatively, such samples, signal portions or measurements may be marked as less or not reliable, and this marking may be considered when evaluating the results of one or more of the processing steps.

In one exemplary realization, the first RAT is compliant with 3GPP Release 8 or higher. For example, the first RAT may be compliant with the Long Term Evolution (LTE) or LTE-Advanced specifications. The second RAT may be compliant with any 3GPP Release. Moreover, the second (or a third) RAT may be compliant with one of the BLUETOOTH communication and IEEE 802.11 standards. The second or third RAT may utilize the ISM band for transmission and/or reception operations.

According to a further aspect, a computer program product is provided that comprises program code portions for performing the steps presented herein when the computer program product is run (or executed) on a device having computing capabilities. The computer program product may be stored on a computer-readable recording medium, such as a CD-ROM, a DVD, a hard disk or a semiconductor memory. Moreover, the computer program product may be provided for download from a download server. The download may be performed, for example, via the Internet or any other network.

Also provided is a device for performing a cell search procedure involving for an investigated frequency multiple serially arranged processing steps until it will be determined that a first network connection can be established on the investigated frequency. The device comprises a receiver adapted to scan multiple carrier frequencies during the cell search procedure. The device further comprises a first processing stage adapted to perform a first processing step for an investigated first frequency and to perform, in parallel with a second or further processing step performed for the first frequency, the first processing step for an investigated second frequency. The second or further processing step is performed by a second (or further) processing stage of the device.

The device may be configured to perform the various steps, processes and procedures presented herein. For example, the receiver may further be adapted to tune from the first frequency to the second frequency.

The device may also comprise a first module supporting the first RAT ("first RAT module") as well as a second module supporting the second RAT ("second RAT module"). The second RAT module may be co-located with the first RAT module in the device. Moreover, the first RAT module may be adapted to perform the cell search procedure while a second connection via the second RAT module is active.

BRIEF DESCRIPTION OF THE DRAWINGS

The technique presented herein will now be described in more detail with reference to exemplary embodiments illustrated in the drawings, wherein

FIGS. 4A and 4B schematically illustrate embodiments in which a reception operation is divided into individual reception intervals or is performed in a continuous manner.

DETAILED DESCRIPTION

In the following description, for purposes of explanation and not limitation, specific details are set forth such as specific processing stages, specific processing steps, and specific orders of processing steps, in order to provide a thorough understanding of the technique presented herein. It will be apparent to one skilled in the art that this technique may be practiced in other embodiments that depart from these specific details. For example, while the embodiments will primarily be described with reference to the LTE and BLUETOOTH communications standard RATs, it will be appreciated that the technique presented herein can also be practiced in combination with other cellular or non-cellular RATs, and in particular in combination with WLAN RATs.

These skilled in the art will further appreciate that the functions explained herein may at least partially be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments will primarily be described with respect to individual stages, components and steps, the technique presented herein may at least partially be embodied in a computer processor and a memory coupled to the processor, wherein the memory is encoded with one or more programs that perform the steps disclosed herein when the one or more programs are executed by the processor.

Figure 1:
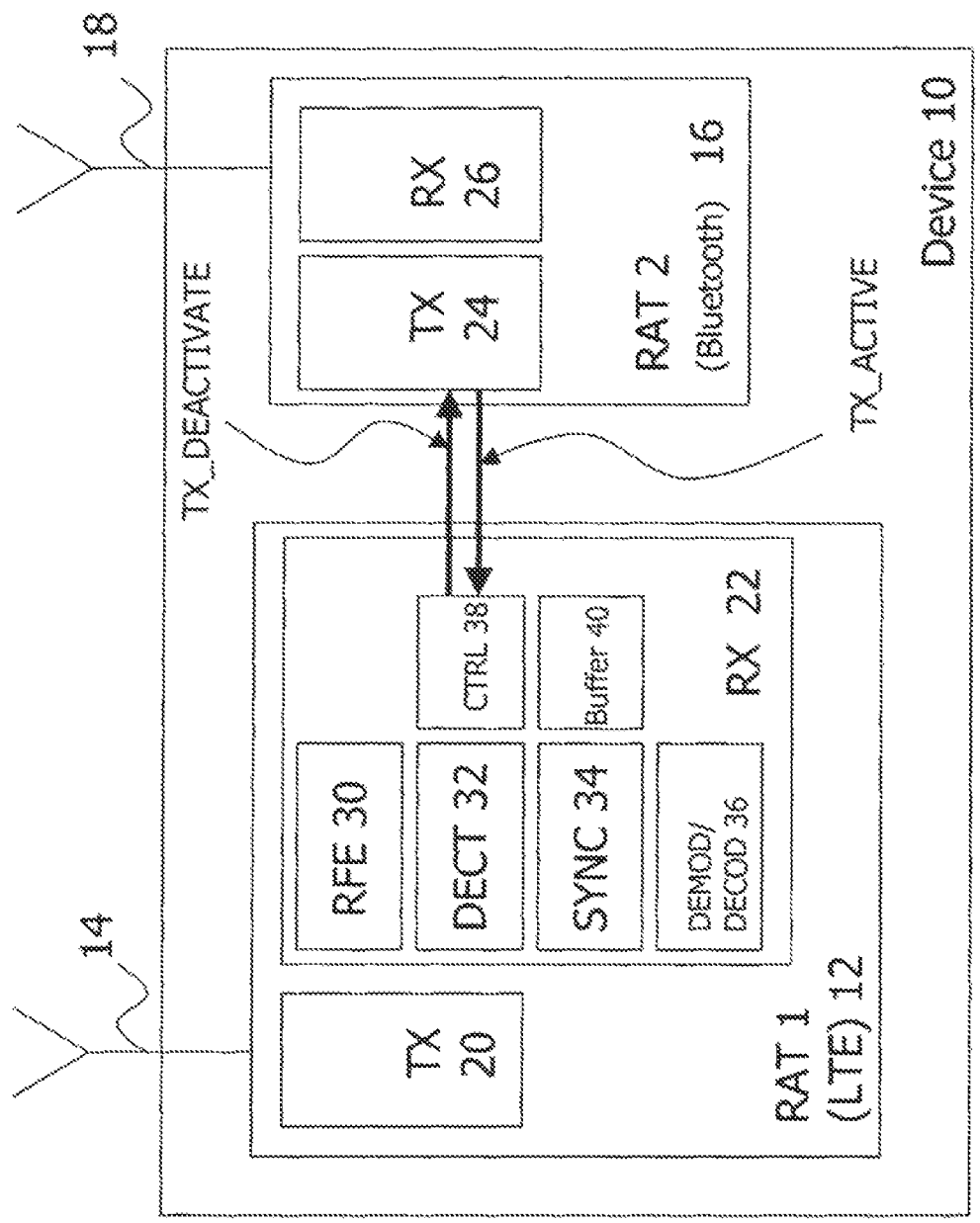
FIG. 1 is a schematic illustration of a device embodiment.

To more easily appreciate the technique presented herein, the following embodiments are described with respect to two exemplary RATs, namely LTE on the one hand and the BLUETOOTH communications standard on the other. FIG. 1 illustrates a schematic diagram of a cellular communication device 10 comprising an LTE module 12 with an associated antenna 14 as well as a BLUETOOTH communications standard module 16 with an associated antenna 18. The cellular communication device 10 can take the form of a mobile telephone, a network card, a network stick, a laptop computer, and so on.

As becomes apparent from FIG. 1, the LTE module 12 comprises an LTE transmitter 20 as well an LTE receiver 22. In a similar manner, the BLUETOOTH communications standard module 16 comprises a BLUETOOTH communications standard transmitter 24 and a BLUETOOTH communications standard receiver 26.

FIG. 1 also illustrates an exemplary configuration of the LTE receiver 26. The LTE receiver 22 comprises a receiver front-end 30 and multiple processing stages arranged serially downstream of the receiver front-end 30. The processing stages include an energy detector 32, a synchronization stage 34, and a demodulation/decoding stage 36. Moreover, a control unit 38 is present for establishing and controlling a communication link between the LTE receiver 22 and the BLUETOOTH communications standard transmitter 24. The LTE receiver 22 further comprises a buffer 40 for storing signal samples to be processed, for example, by the synchronization stage 34.

It will be supposed in the following that LTE is used in the 2.5-2.69 GHz band and that BLUETOOTH communications standard is used in the 2.4-2.485 GHz ISM band. Specifically, it will be supposed that the FDD mode of LTE is used, where the uplink (UL) is allocated to 2500-2570 MHz and the downlink (DL) to 2620-2690 MHz. These paired frequencies for FDD operation are commonly known as Band 7.

As the LTE and BLUETOOTH communications standard modules 12, 16 are implemented in the same device 10, they potentially cause interference to one another. In particular, when the LTE transmitter 20 is transmitting at the maximum output power of +23 dBm, the BLUETOOTH communications standard receiver 26 might be blocked completely. Also in the other direction the interference might have a detrimental impact. Suppose that the noise floor of LTE is at −109 dBm/MHz, which corresponds to a noise figure (NF) of 5 dB. The BLUETOOTH communications standard transmitter 24 may have Out-Of-Band (OOB) emission levels in the order of −60 dBm/MHz. Assuming that the antenna coupling between the LTE antenna 14 and the BLUETOOTH communications standard antenna 18 is −10 dB, this implies that the noise floor for the LTE receiver 22 will be raised from −109 dBm/MHz to −70 dBm/MHz, i.e., a loss in sensitivity by 40 dB.

When the LTE and BLUETOOTH communications standard modules 12, 16 are both operating in an active mode, it is possible to schedule the transmissions for these two RATs such that their general operations will still work, although with reduced performance. This can be achieved by proper time-sharing (i.e., time-multiplexing).

However, a more challenging situation occurs when the LTE module 12 needs to perform the initial search for a network (e.g., when the device 10 has been turned on after a flight) while the BLUETOOTH communications standard module 16 is active. The LTE cell search might for instance be given priority, but with the constraint that enough time is allocated to BLUETOOTH communications standard transmission operations to ensure that the existing BLUETOOTH communications standard connection is not lost (but, e.g., only degraded). Clearly, in this case the time it takes to perform the initial cell search is much more of an issue. A cell search lasting 10 seconds means that during these 10 seconds the user will actually experience that a running service or any other ongoing operation involving the active BLUETOOTH communications standard module 16 is not properly working.

In general, when the initial cell search is given priority over an ongoing operation, a long search time might severely degrade the user experience. It therefore becomes much more important to perform the initial search as quickly as possible. In the following, a technique for accelerating the cell search procedure is described for the dual-RAT device 10 illustrated in FIG. 1. It should be noted that this technique could also advantageously be implemented in a single-RAT device (e.g., when the BLUETOOTH communications standard module 16 is omitted).

After the device 10 has been turned on, it needs to investigate a considerable number of carrier frequencies in order to find an LTE network. Such a frequency scan starts with the radio front-end 30 of the LTE receiver 22 being tuned to a first frequency that is to be investigated. The frequencies to be investigated (and the order in which the frequencies are to be investigated) may be read from a list locally available to the device 10.

As illustrated in FIG. 1, the energy detector 32 implemented in an analog part of the LTE receiver 22 evaluates a signal strength (e.g., a power level) on the first frequency. If the signal strength on the currently investigated frequency is found to be below a predetermined threshold, it is concluded that there is no LTE signal. As a result, the radio front-end 30 of LTE receiver 22 performs frequency tuning to the next possible frequency in the list.

In case the signal energy is above the threshold, the processing continues (after an analog/digital conversion operation) by trying to obtain time and frequency synchronization by the synchronization stage 34. For LTE the synchronization might be done in the time domain, prior to a Fast Fourier Transform (FFT) processing. The synchronization algorithm is typically based on the knowledge that the desired signal is an Orthogonal Frequency Division Multiplexing (OFDM) signal as defined in the LTE specifications. For instance, a coarse time and frequency synchronization might be obtained by performing auto-correlation of the received signal, with a delay lag equal to the duration of the useful part of an OFDM symbol.

If both time and frequency synchronization can achieved, the cell search procedure continues with FFT processing, channel estimation, demodulation, decoding etc. in a third or higher processing stage (including the demodulation/decoding stage 36). Depending on the outcome of, for example, the demodulation and decoding operations, the LTE receiver 22 can finally determine if the OFDM signal actually belongs to an LTE network. If it is a "valid" LTE network, an access procedure will start in a next step with the purpose to register the device 10 in the LTE network.

As has become apparent, the cell search procedure to declare a certain carrier frequency as valid for initiating an access procedure can coarsely be split into the following three processing steps, with the corresponding time for completing the respective processing stage being denoted T1, T2, and T3:

1. Tuning to the intended carrier frequency and performing energy detection.
2. Performing initial time and frequency estimation.
3. Performing demodulation and decoding operations.

Figure 2:
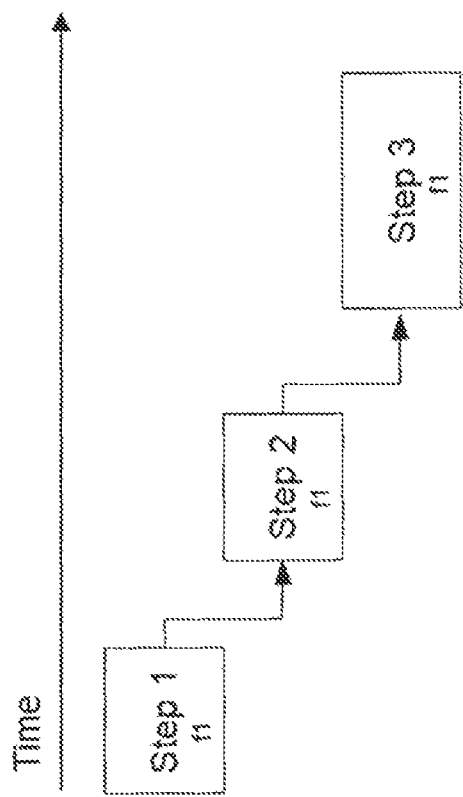
FIG. 2 is a flow diagram schematically illustrating the pipelining of processing steps during a cell search procedure.

Conventionally, the multiple processing steps of a cell search procedure are performed in a serial fashion as generally illustration in the flow chart FIG. 2), wherein one possible carrier frequency after the other is evaluated. Only once it is determined that no network connection can be established on an investigated frequency, the search continues with the next possible frequency in the list. When there are N_freq frequencies in total to be scanned, the total time for a complete scan thus equals N_freq×(T1+T2+T3).

Figure 3:
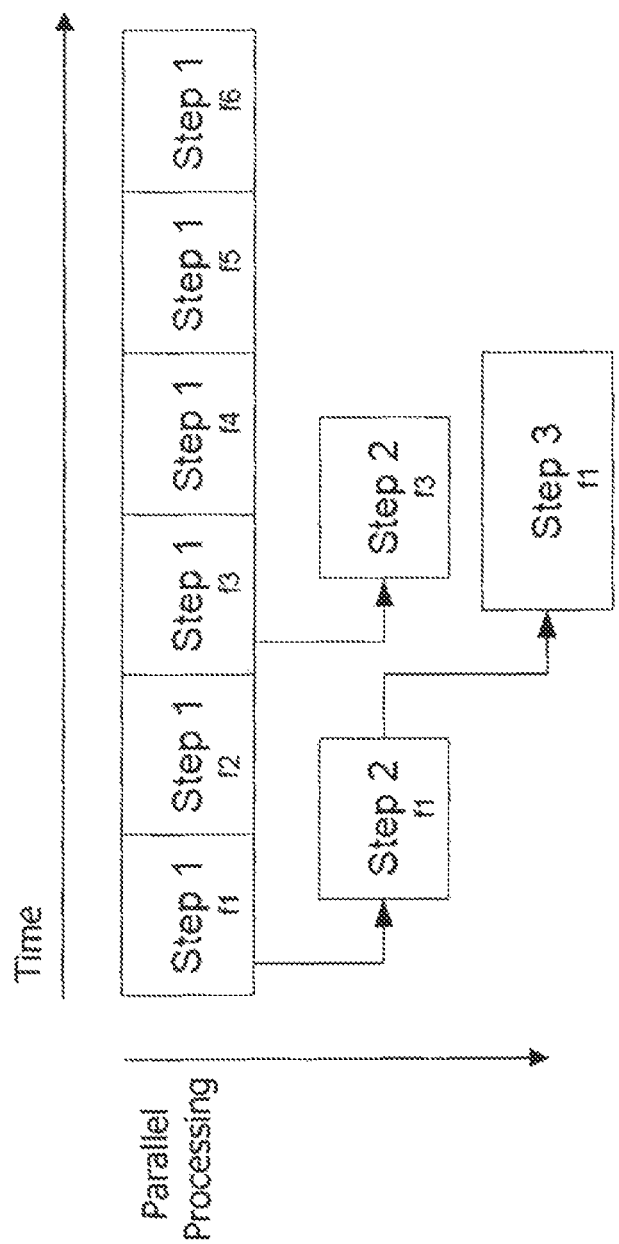
FIG. 3 is a flow diagram schematically illustrating the parallel execution of pipelined processing steps according to a further embodiment.

According to one embodiment, the initial cell search procedure is performed in a pipelined fashion with multiple processing steps being arranged in parallel as generally depicted in the flow chart of FIG. 3.

1. In step 1, the radio front-end 30 is tuned to the carrier frequency to be investigated first ("f1"), and energy detection is performed by the energy detector 32. At the same time as energy detection is performed, the signal samples are A/D converted and fed to the buffer (or memory) 40.
2. As soon as there are samples available in the buffer 40, the initial time and frequency estimations are started in step 2 by synchronization stage 34. If the energy detection meanwhile declares that the signal level is below the threshold, the initial estimations are aborted and the radio front-end 30 is tuned to the second frequency to be investigated ("f2"). If, alternatively, the initial estimation indicates that the investigations for this frequency should be aborted (e.g., because no synchronization can be achieved) the procedure also continues on the next frequency.
3. If the initial estimation indicates that there might be a valid LTE signal, the frequency error is corrected by synchronization stage 34 in accordance with the found frequency estimate and an FFT is applied according to the found time estimate. Processing then continues with step 3 (demodulation and decoding in module 36).

Still referring to FIG. 3, in this particular example the investigations for carrier frequency f1 reveal in step 2 and step 3 that there might be a valid LTE signal present.

After the buffer 40 has been filled with a sufficient number of samples collected on frequency f1 in step 1 to perform the subsequent steps, the radio front-end 30 had nonetheless immediately been tuned to frequency f2. The energy detector 32 indicated that there is no signal available on frequency f2, and step 2 is not even started for this frequency. On frequency f3, the energy detector 32 indicated that there is some kind of signal, and therefore the signal is processed also according to step 2 (to determine that it is not a valid signal). Meanwhile, step 3 is executed for the signal received on frequency f1. The radio front-end 30 is subsequently tuned to frequency f4, frequency f5, and frequency f6, where no signal energy is detected and further signal processing steps are therefore not performed.

It should be noted that once enough samples have been obtained from the radio front-end 30, steps 2 and 3 can be performed regardless of whether it is possible to actually obtain reliable samples from step 1 or not. As becomes apparent from FIG. 3, step 1, step 2, and step 3 may all operate simultaneously (i.e., in parallel) on samples obtained for different carrier frequencies.

In a second embodiment illustrated in FIG. 4A, the frequency scanning takes interference from BLUETOOTH communications standard module 16 into account. The BLUETOOTH communications standard module 16 may notify the scanning LTE module 12 by a logical signal TX_ACTIVE as illustrated in FIG. 1 of a transmission operation. The optional control unit 38 of the scanning LTE module 12 may then decide responsive to the TX_ACTIVE signal whether or not the interfering BLUETOOTH communications standard module 16 will be allowed to transmit. Additionally, or as an alternative, the scanning module 12 may take this knowledge into account by requesting to be able to receive without being interfered with for long enough time to collect a sufficient amount of data for step 2 to be performed with reasonable reliability, but not in large excess of that in order to limit the impact on the interfering module 16. To this end, the control unit 38 may transmit a logical signal TX_DEACTIVATE to the transmitter 24 of the interfering module 16 to selectively pause the transmission operation. Alternatively, the TX_DEACTIVATE signal may also be transmitted during an ongoing reception operation for a cell search procedure without having been notified of a transmission operation from the interfering module 16 (i.e., without having received the TX_ACTIVE signal).

As an example, suppose that the second processing step requires data corresponding to 5 ms continuous reception in order to work at all, but that 30 ms are required to give results with sufficient accuracy. The scanning module 12 can then schedule the reception operation to consist of six 5 ms slots separated by, for example, 5 ms intervals as illustrated in the upper half of FIG. 4A. In this way, the procedure would still work, but would take 55 ms instead of 30 ms. At the same time, the impact on the interfering module 16 might be acceptable as the transmission operations are only paused during six 5 ms intervals as shown in the lower half of FIG. 4A. If instead the complete 30 ms reception operation would have been performed continuously, disabling the BLUETOOTH communications standard module 16 for the entire time might (in case of a delay sensitive application, service or any other operation) cause a noticeable degradation or even a connection breakdown.

In addition, even if 30 ms are required to ensure a certain accuracy, under favourable signal conditions 5 ms of continuous reception in step 1 might suffice to trigger step 2 processing on the currently investigated frequency. In this case, step 2 and the further steps, which can be performed even if the interfering module 16 is transmitting, will detect this, and therefore the radio front-end 30 can be tuned prematurely to the next frequency to prepare for the next 5 ms slot. In this case, the additional delay of the frequency scan would be minimal since the synchronisation procedure (step 2) is not affected by interference.

According to a third embodiment illustrated in FIG. 4B, the interfering transmitter 24 is not affected (i.e., not paused) at all during an ongoing cell search procedure. The interfering transmitter 24 merely notifies the scanning receiver 22 of an ongoing transmission operation via the TX_ACTIVE signal. The scanning module takes this knowledge into account to improve the scanning performance by internally discarding the corresponding signal, sample or measurement obtained during the transmission operation. Alternatively, the corresponding signal, sample or measurement as processed during any processing step could be marked as less or not reliable, and this marking may be taken into account during the corresponding or any further processing step.

As an example illustrated in FIG. 4B, it is supposed that for a reliable investigation, a total reception of 25 ms is needed, while the interfering transmitter 24 has scheduled transmission operations of 5 ms every 10 ms (as shown in the lower of half of FIG. 4B). In such a situation, the scanning device 12 can schedule a continuous reception of 50 ms, but process only those five 5 ms reception intervals during which the received signal is not interfered to make sure that 25 ms of non-interfered signal are received in total (see upper half of FIG. 4B).

It should be noted that the approaches of the second and third embodiment as generally illustrated in FIGS. 4A and 4B can particularly profit from a pipelined, parallel processing as illustrated in FIG. 3. However, these approaches can in principle also be practiced in the serial processing scenario illustrated in FIG. 2.

As has become apparent from the above embodiments, the total duration of a cell search procedure can be reduced if the frequency scanning is performed in a pipelined fashion such that different processing steps operate simultaneously on signals received on two or more carrier frequencies. Moreover, in multi-RAT systems a specific scheduling of reception operations of a scanning RAT module and transmission operations of a potentially interfering RAT module can be suitably selected to reduce the mutual impact of the reception and transmission operations. The scheduling may involve notifying the other system of a cell search/reception operation and/or transmission operation using dedicated signaling.

While the current invention has been described in relation to its preferred embodiments, it is to be understood that this disclosure is for illustrative purposes only. Accordingly, it is intended that the invention be limited only be scope of claims appended hereto.

The invention claimed is:

1. A method of scanning multiple carrier frequencies during a cell search procedure, wherein the cell search procedure involves, for an investigated frequency, multiple serially arranged processing steps before determining that a first network connection can be established on the investigated frequency, the method comprising:
performing a first processing step for an investigated first frequency;
thereafter, tuning from the first frequency to a second frequency; and
in parallel with performing a second processing step for the first frequency, performing the first processing step for the investigated second frequency;
wherein the first processing step includes at least one of tuning, signal energy detection, and analog/digital signal conversion; and
wherein the second processing step includes at least one of an initial time estimation and an initial frequency estimation.

2. The method of claim 1 wherein the tuning step is performed after determining that sufficient first frequency samples are available to perform the second processing step for the first frequency.

3. The method of claim 1 wherein the tuning step is performed after determining that the cell search procedure on the first frequency can be aborted.

4. The method of claim 1 further comprising performing a third processing step for at least one of the first and second frequencies.

5. The method of claim 4 wherein the third processing step includes at least one of demodulation and decoding.

6. The method of claim 1 wherein the cell search procedure is performed on the basis of a first Radio Access Technology (RAT) while a second connection via a second RAT, co-located with the first RAT, is active.

7. The method of claim 6 further comprising controlling transmission of the second RAT based on knowledge of when the cell search procedure is performed based on the first RAT.

8. The method of claim 7 further comprising pausing a transmission operation of the second RAT during at least a portion of the cell search procedure.

9. The method of claim 8 wherein the portion of the cell search procedure is a reception operation performed during the cell search procedure.

10. The method of claim 6:
wherein a transmission operation of the second RAT is performed in parallel with at least a portion of the cell search procedure;
evaluating the result of one or more of the processing steps based on knowledge of when the second RAT is or has been transmitting.

11. The method of claim 10 further comprising discarding or marking at least one of samples, signal portions, and measurements obtained by one or more of the processing steps during a transmission operation of the second RAT.

12. The method of claim 6 wherein the first RAT is compliant with 3GPP Release 8 or higher and the second RAT is compliant with at least one of BLUETOOTH and IEEE 802.11 standards.

13. A method of scanning multiple carrier frequencies during a cell search procedure, wherein the cell search procedure involves, for an investigated frequency, multiple serially arranged processing steps before determining that a first network connection can be established on the investigated frequency, the method comprising:
performing a first processing step for an investigated first frequency;
thereafter, tuning from the first frequency to a second frequency;
in parallel with performing a second processing step for the first frequency, performing the first processing step for the investigated second frequency;
wherein the cell search procedure is performed on the basis of a first Radio Access Technology (RAT) while a second connection via a second RAT, co-located with the first RAT, is active;
controlling transmission of the second RAT based on knowledge of when the cell search procedure is performed based on the first RAT;
pausing a transmission operation of the second RAT during at least a portion of the cell search procedure, wherein the portion of the cell search procedure is a reception operation performed during the cell search procedure;
wherein the reception operation is performed in multiple temporally spaced apart reception intervals;
wherein the transmission operation of the second RAT is resumed between two adjacent reception intervals.

14. The method of claim 13:
wherein the tuning step is performed after determining that sufficient first frequency samples are available to perform the second processing step for the first frequency;
wherein the tuning step is performed after conclusion of the reception operation.

15. The method of claim 13:
further comprising determining after each reception interval if the next processing step can be performed;
concluding the reception operation in response to a successful determination.

16. A non-transient computer readable medium containing program instructions for scanning multiple carrier frequencies during a cell search procedure, wherein the cell search procedure involves, for an investigated frequency, multiple serially arranged processing steps before determining that a first network connection can be established on the investigated frequency, the computer program product comprising software code instructions which, when run on a data processor of a device, causes the device to:
perform a first processing step for an investigated first frequency;
thereafter, tune from the first frequency to a second frequency; and
in parallel with performing a second processing step for the first frequency, perform the first processing step for the investigated second frequency;
wherein the first processing step includes at least one of tuning, signal energy detection, and analog/digital conversion; and
wherein the second processing step includes at least one of an initial time estimation and an initial frequency estimation.

17. A device for performing a cell search procedure involving, for an investigated frequency, multiple serially arranged processing steps before determining that a first network connection can be established on the investigated frequency, the device comprising:
- a receiver configured to scan multiple carrier frequencies during the cell search procedure and to tune from a first investigated frequency to a second investigated frequency;
- a first processing stage configured to:
  - perform a first processing step for the first frequency;
  - perform, in parallel with performance of a second processing step for the first frequency, the first processing step for the second frequency; and
- a second processing stage configured to perform the second processing step;
- wherein the first processing step includes at least one of tuning, signal energy detection, and analog/digital signal conversion; and
- wherein the second processing step includes at least one of an initial time estimation and an initial frequency estimation.

18. The device of claim 17 wherein the receiver is further configured to tune from the first frequency to the second frequency before the first processing stage starts the first processing step for the second frequency.

19. The device of claim 17:
- wherein the device further comprises a first Radio Access Technology (RAT) module and a second RAT module co-located with the first RAT module;
- wherein the first RAT module is configured to perform the cell search procedure while a second connection via the second RAT module is active.

* * * * *

UNITED STATES PATENT AND TRADEMARK OFFICE
CERTIFICATE OF CORRECTION

PATENT NO. : 8,706,108 B2  
APPLICATION NO. : 13/496543  
DATED : April 22, 2014  
INVENTOR(S) : Wilhelmsson et al.

Page 1 of 1

It is certified that error appears in the above-identified patent and that said Letters Patent is hereby corrected as shown below:

In the Specification

In Column 5, Line 8, delete "LTE receiver 26." and insert -- LTE receiver 22. --, therefor.

In Column 6, Line 57, delete "FIG. 2)," and insert -- FIG. 2, --, therefor.

Signed and Sealed this  
Seventh Day of April, 2015

Michelle K. Lee  
*Director of the United States Patent and Trademark Office*